(12) United States Patent
Chellew

(10) Patent No.: US 10,926,368 B2
(45) Date of Patent: Feb. 23, 2021

(54) PART ILLUMINATION STATUS LIGHTS

(71) Applicant: Ingersoll-Rand Industrial U.S., Inc., Davidson, NC (US)

(72) Inventor: Justin T. Chellew, Bethlehem, PA (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 289 days.

(21) Appl. No.: 15/717,695

(22) Filed: Sep. 27, 2017

(65) Prior Publication Data
US 2019/0091824 A1 Mar. 28, 2019

(51) Int. Cl.
*F21V 33/00* (2006.01)
*B25B 23/147* (2006.01)
*H05B 47/105* (2020.01)
*B23Q 17/24* (2006.01)
*B25F 5/02* (2006.01)
(Continued)

(52) U.S. Cl.
CPC ........ *B23Q 17/2452* (2013.01); *B25B 23/147* (2013.01); *B25B 23/1456* (2013.01); *B25F 5/02* (2013.01); *F21V 23/0457* (2013.01); *F21V 33/008* (2013.01); *H05B 47/105* (2020.01); *B23Q 2717/00* (2013.01)

(58) Field of Classification Search
CPC ............ B23Q 17/2452; B23Q 2717/00; B25B 23/147; B25B 23/1456; H05B 37/0227; F21V 23/0457; F21V 33/008; B25F 5/02; B25F 5/00
USPC .... 362/119, 109, 578; 173/182, 2, 217, 176, 173/180, 181
See application file for complete search history.

(56) References Cited

U.S. PATENT DOCUMENTS 3,745,820 A * 7/1973 Weiner .................... F16L 15/00
73/862.25
3,962,910 A * 6/1976 Spyridakis .......... B25B 23/1456
73/761
(Continued)

FOREIGN PATENT DOCUMENTS

WO 2012/167241 A1 12/2012

OTHER PUBLICATIONS

International Search Report dated Feb. 25, 2019; EP 18197323.1; Filing Date Sep. 27, 2018.

*Primary Examiner* — Hemant Desai
*Assistant Examiner* — Christopher Robin Kim
(74) *Attorney, Agent, or Firm* — Kevin E. West; Advent, LLP

(57) ABSTRACT

A power tool is provided. The tool has a housing containing an internal drive system that drives an output member that engages a workpiece and exerts mechanical force thereupon. A force sensor and a positional sensor are operatively connected to the drive system to sense characteristic variables of the drive system during engagement of the workpiece. A light unit is positioned on a front end and a top portion of the housing so as to be able to direct light of various colors onto the workpiece. A control unit is operatively connected to the drive system and the light unit so as to control the light unit based on the characteristic variables of the drive system measured by the sensors. The light unit may illuminate a colored light on the workpiece depending on whether or not the workpiece was determined to be fastened according to predetermined specifications.

15 Claims, 2 Drawing Sheets

(51) Int. Cl.
*F21V 23/04* (2006.01)
*B25B 23/145* (2006.01)

(56) References Cited

U.S. PATENT DOCUMENTS

| | | | | |
|---|---|---|---|---|
| 4,013,895 A * | 3/1977 | Akiyoshi | ............ | B25B 23/1456 307/126 |
| 4,016,938 A * | 4/1977 | Rice | ............ | B25B 23/1456 173/1 |
| 4,639,996 A * | 2/1987 | Fullmer | ............ | B23P 19/065 29/407.02 |
| 5,289,885 A * | 3/1994 | Sakoh | ............ | B25B 23/1405 173/109 |
| 5,313,376 A * | 5/1994 | McIntosh | ............ | F21V 33/0084 362/119 |
| 5,366,026 A | 11/1994 | Maruyama et al. | | |
| 5,473,519 A * | 12/1995 | McCallops | ............ | B25B 23/00 362/120 |
| 5,525,842 A * | 6/1996 | Leininger | ............ | B25F 5/00 290/54 |
| 6,212,763 B1 * | 4/2001 | Newman | ............ | B25B 21/002 173/180 |
| 7,090,030 B2 | 8/2006 | Miller | | |
| 7,109,675 B2 * | 9/2006 | Matsunaga | ............ | H02J 7/0031 173/128 |
| 7,200,516 B1 | 4/2007 | Cowley | | |
| 7,210,541 B2 | 5/2007 | Miller | | |
| 7,815,356 B2 | 10/2010 | Lutz et al. | | |
| 8,042,966 B2 | 10/2011 | Lutz et al. | | |
| 8,272,452 B2 * | 9/2012 | Katou | ............ | B25D 11/005 173/2 |
| 8,317,350 B2 | 11/2012 | Friedman | | |
| 8,328,381 B2 | 12/2012 | Dixon | | |
| 8,347,978 B2 * | 1/2013 | Forster | ............ | B25C 1/06 173/1 |
| 9,028,088 B2 | 5/2015 | Vanko et al. | | |
| 9,194,684 B2 | 11/2015 | DeYaeger | | |
| 9,243,880 B2 | 1/2016 | DeYaeger | | |
| 9,279,653 B2 | 3/2016 | DeYaeger | | |
| 9,328,915 B2 | 5/2016 | Vanko et al. | | |
| 9,352,458 B2 | 5/2016 | Friedman et al. | | |
| 9,473,053 B2 | 10/2016 | Lim et al. | | |
| 9,539,691 B2 | 1/2017 | Hirschburger | | |
| 9,593,926 B2 | 3/2017 | DeYaeger | | |
| 9,644,837 B2 | 5/2017 | Vanko et al. | | |
| 2002/0050364 A1 * | 5/2002 | Suzuki | ............ | B25B 23/1405 173/1 |
| 2003/0202851 A1 * | 10/2003 | Kovarik | ............ | F16D 1/10 408/8 |
| 2004/0040727 A1 * | 3/2004 | Miller | ............ | B25B 21/00 173/2 |
| 2005/0034881 A1 * | 2/2005 | Berger | ............ | F16N 11/04 173/2 |
| 2005/0173142 A1 * | 8/2005 | Cutler | ............ | B25B 21/00 173/181 |
| 2006/0220612 A1 * | 10/2006 | Feldmann | ............ | B25F 5/022 320/114 |
| 2006/0267556 A1 * | 11/2006 | Uehlein-Proctor | ....... | B25F 5/00 320/132 |
| 2007/0044983 A1 * | 3/2007 | Wuensch | ............ | B25F 5/00 173/217 |
| 2007/0193762 A1 * | 8/2007 | Arimura | ............ | B25F 5/00 173/217 |
| 2008/0000333 A1 * | 1/2008 | Seno | ............ | B23P 19/06 81/467 |
| 2010/0038103 A1 * | 2/2010 | Ueda | ............ | B25B 23/18 173/46 |
| 2010/0200260 A1 * | 8/2010 | Mikami | ............ | B25B 21/00 173/176 |
| 2010/0263132 A1 * | 10/2010 | Anderson | ............ | A01K 97/00 7/106 |
| 2010/0265097 A1 * | 10/2010 | Obatake | ............ | B25B 21/00 340/870.4 |
| 2010/0307782 A1 * | 12/2010 | Iwata | ............ | B25F 5/00 173/1 |
| 2012/0191250 A1 * | 7/2012 | Iwata | ............ | B25F 5/00 700/275 |
| 2012/0234569 A1 * | 9/2012 | Lawton | ............ | B25B 21/00 173/181 |
| 2012/0279736 A1 * | 11/2012 | Tanimoto | ............ | B25B 23/1475 173/2 |
| 2013/0002175 A1 * | 1/2013 | Shimizu | ............ | B25F 5/02 318/139 |
| 2013/0327552 A1 * | 12/2013 | Lovelass | ............ | B25B 23/147 173/1 |
| 2013/0331994 A1 * | 12/2013 | Ng | ............ | G05B 15/02 700/275 |
| 2014/0166324 A1 * | 6/2014 | Puzio | ............ | B25F 5/001 173/20 |
| 2014/0284070 A1 * | 9/2014 | Ng | ............ | B25F 5/02 173/2 |
| 2015/0041164 A1 * | 2/2015 | Sergyeyenko | ........ | B25B 23/147 173/1 |
| 2015/0042247 A1 * | 2/2015 | Kusakawa | ............ | B25F 5/00 318/139 |
| 2016/0221175 A1 * | 8/2016 | Aoki | ............ | B24B 23/04 |
| 2016/0318165 A1 * | 11/2016 | Thorson | ............ | B25B 23/141 |
| 2016/0354889 A1 | 12/2016 | Ely et al. | | |
| 2016/0354905 A1 | 12/2016 | Ely et al. | | |
| 2017/0203421 A1 | 7/2017 | Vanko et al. | | |
| 2019/0283222 A1 * | 9/2019 | Thorson | ............ | B25B 23/147 |

* cited by examiner

PART ILLUMINATION STATUS LIGHTS

BACKGROUND

Technical Field

The present disclosure relates to power tools, and in particular to lighting components of power tools.

State of the Art

Power tools often utilize a headlight to locate workpieces on which work is to be performed. Power tools can also utilize illumination to indicate a status of the tool or the tool's operation.

Determining where a workpiece or piece part is located and whether or not the proper operation has been achieved may oftentimes be a difficult or cumbersome task. In fact, at times the user may operate the tool on a selected piece part and thereafter move to the next piece part without noticing that the previous operation was incorrect.

Accordingly, there is a need in the industry for an apparatus that can accurately, consistently, and conveniently illuminate a piece part, as well as report to the user that the operation of the piece part has been successful.

SUMMARY

The present disclosure relates to disclosure relates to power tools, and in particular to lighting components of power tools, including precision assembly power tools.

An aspect of the present disclosure includes a power tool comprising: a housing containing an internal drive system that drives an output member; a work element coupled for rotation with the output member, the work element being configured to engage a workpiece and exert mechanical force thereupon; a sensor operatively connected to the drive system to sense a characteristic variable of the drive system; a light unit positioned on a front end of the housing and configured to direct light to the workpiece; and a control unit operatively connected to the drive system and the light unit, the control unit configured to control the light unit based on the characteristic variable of the drive system measured by the sensor.

Another aspect of the present disclosure includes wherein the sensor is a force sensor and the characteristic variable is a torque value of the drive system.

Another aspect of the present disclosure includes wherein the sensor is a positional sensor and the characteristic variable is a rotational value of the drive system.

Another aspect of the present disclosure includes wherein the light unit is positioned on a top portion of the housing.

Another aspect of the present disclosure includes wherein the light unit exhibits light of varying color.

Another aspect of the present disclosure includes a power source and an actuator that transitions between an engaged state and a disengaged state, wherein in the engaged state the drive system is coupled to the power source for powered operation of the tool, and wherein in the disengaged state the drive system is decoupled from the power source.

Another aspect of the present disclosure includes wherein in the engaged state the light unit exhibits light of a first color.

Another aspect of the present disclosure includes wherein the control unit receives the characteristic variable from the sensor and calculates a difference between the characteristic variable and a predetermined value, and wherein if the difference is within a first range the control unit directs the light unit to exhibit light of a second color, if the difference is within a second range the control unit directs the light unit to exhibit light of a third color, and if the difference is within a third range the control unit directs the light unit to exhibit light of a fourth color.

Another aspect of the present disclosure includes wherein the control unit receives the characteristic variable from the sensor and calculates a difference between the characteristic variable and a predetermined value, and wherein if the difference is within a predetermined tolerance the control unit directs the light unit to exhibit light of a second color, and wherein if the difference is outside the predetermined tolerance the control unit directs the light unit to exhibit light of a third color.

Another aspect of the present disclosure includes wherein the predetermined value is one of a required torque value or a number of rotations of the drive system.

Another aspect of the present disclosure includes wherein the predetermined value is one of a required torque value or a number of rotations of the drive system.

Another aspect of the present disclosure includes a power tool comprising: a housing containing an internal drive system that drives an output member; a work element coupled for rotation with the output member, the work element being configured to engage a workpiece and exert mechanical force thereupon; a first sensor operatively connected to the drive system to sense a first characteristic variable of the drive system during engagement of the workpiece; a second sensor operatively connected to the drive system to sense a second characteristic variable of the drive system during engagement of the workpiece; a light unit positioned on a front end and a top portion of the housing and configured to direct light of a first color to the workpiece; and a control unit operatively connected to the drive system and the light unit, the control unit configured to control the light unit based on the characteristic variables of the drive system measured by the sensors.

Another aspect of the present disclosure includes wherein the first sensor is a force sensor and the first characteristic variable is a torque value of the drive system, and wherein the second sensor is a positional sensor and the second characteristic variable is a number of rotations of the drive system.

Another aspect of the present disclosure includes wherein the control unit receives the characteristic variables from the sensors and calculates a difference between each of the characteristic variables and a corresponding predetermined value, and wherein if both of the differences are within a predetermined tolerance the control unit directs the light unit to exhibit light of a second color, and wherein if either of the differences is outside the predetermined tolerance the control unit directs the light unit to exhibit light of a third color.

Another aspect of the present disclosure includes a power source and an actuator that transitions between an engaged state and a disengaged state, wherein in the engaged state the drive system is coupled to the power source for powered operation of the tool, and wherein in the disengaged state the drive system is decoupled from the power source, and wherein the control unit calculates the difference and directs the light unit at a transition from the engaged state to the disengaged state.

Another aspect of the present disclosure includes method of fastening a workpiece using a power tool, the method comprising: providing a power tool having an internal drive system coupled to an output member; engaging the workpiece by way of the output member; applying mechanical force to the workpiece by providing power to the drive system to rotate the output member; measuring a characteristic variable of the drive system; comparing the characteristic variable to a predetermined variable; and controlling a light unit based on the comparing.

Another aspect of the present disclosure includes exhibiting a first light color from the light unit onto the workpiece during the applying mechanical force to the workpiece.

Another aspect of the present disclosure includes wherein the controlling a light unit further comprises exhibiting a second light color from the light unit onto the workpiece if the characteristic variable is within a tolerance range.

Another aspect of the present disclosure includes wherein the controlling a light unit further comprises exhibiting a third light color from the light unit onto the workpiece if the characteristic variable is outside the tolerance range.

Another aspect of the present disclosure includes wherein the measuring a characteristic variable of the drive system occurs after the applying mechanical force to the workpiece has ceased.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

Figure 1:
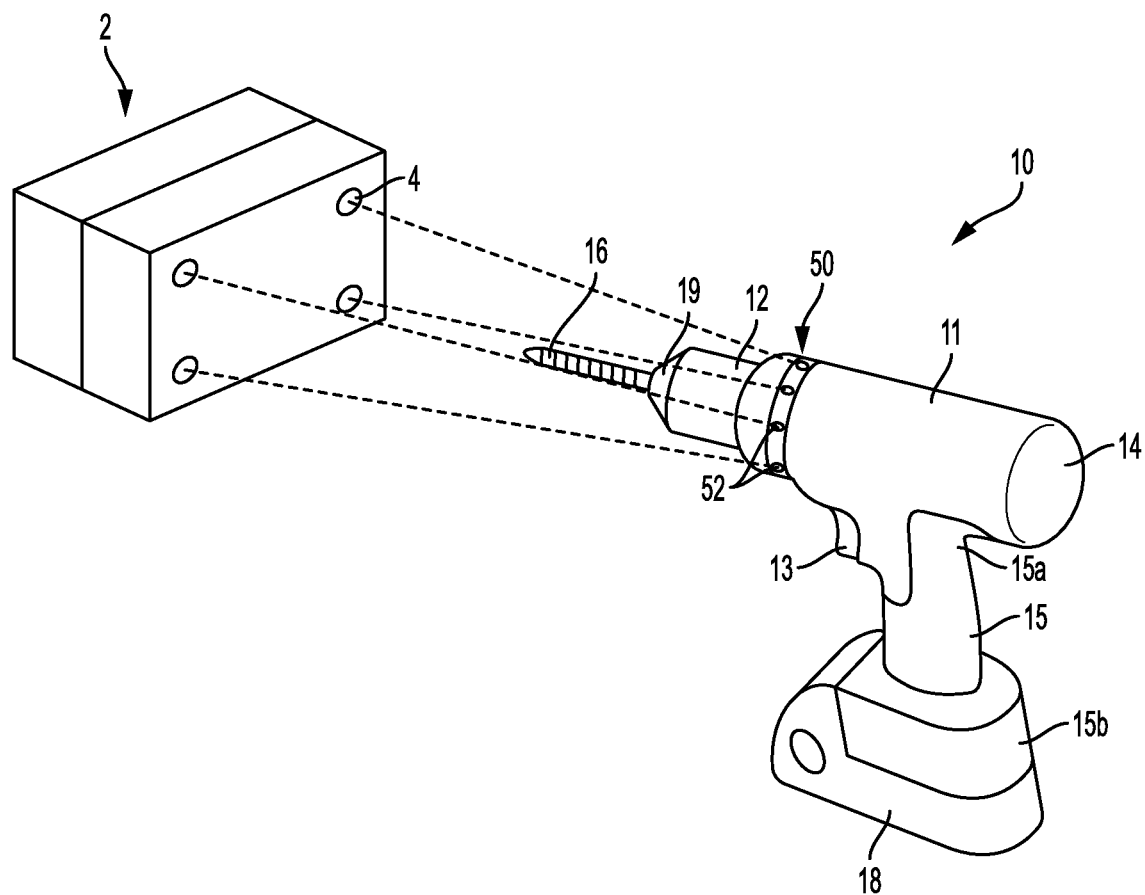
FIG. 1 is a side perspective view of an embodiment of a power tool in accordance with the present disclosure.
Figure 2:
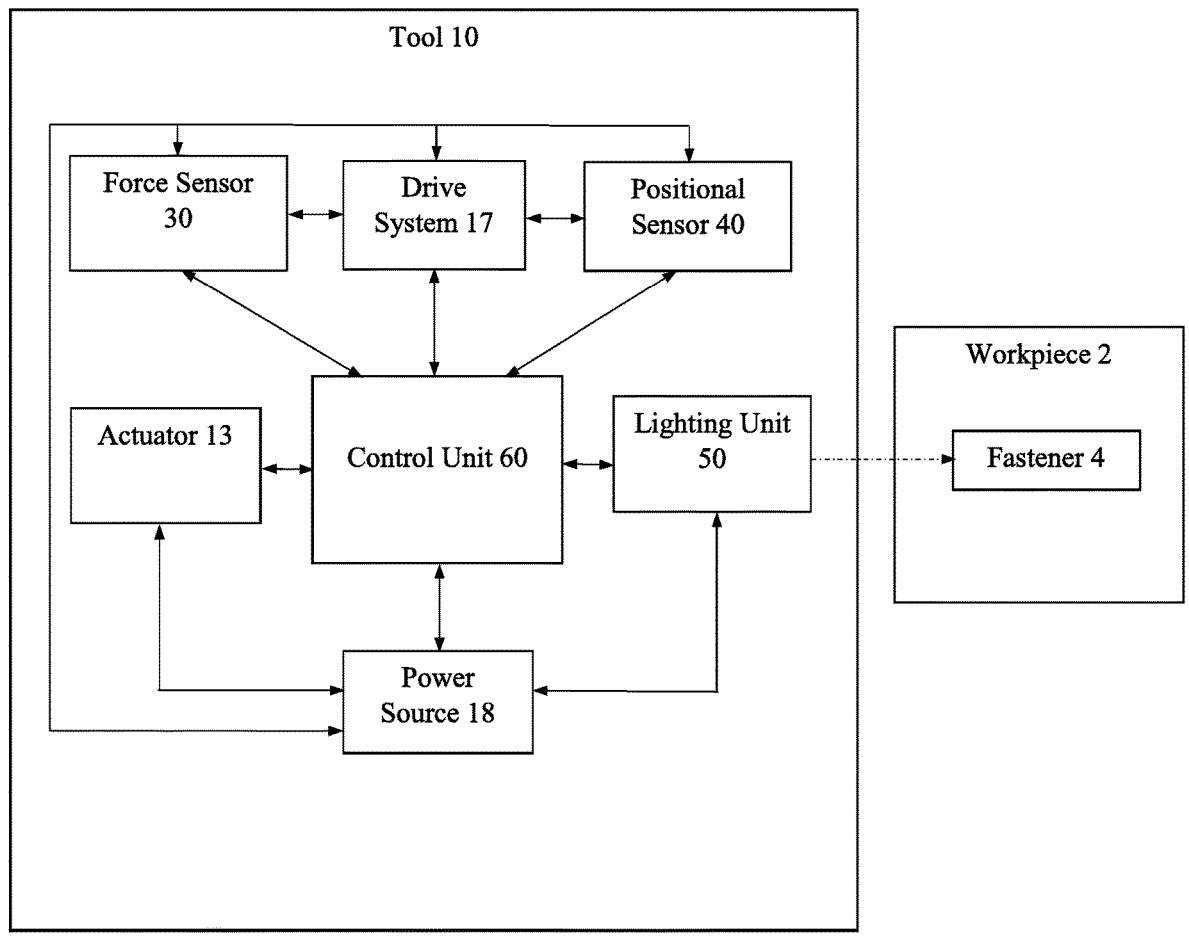
FIG. 2 is a schematic view of an embodiment of a power tool in accordance with the present disclosure.

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

The drawings depict one or more illustrative embodiments of a power tool 10. These embodiments may comprise various structural and functional components that complement one another to provide the unique functionality and performance of the tool 10, the particular structure and function of which will be described in greater detail herein. For example, the tool 10 may comprise one or more sensors and light elements, among other various components to be described herein.

Referring to the drawings, embodiments of the tool 10 may comprise a housing 11 that encloses a source of motion, such as, for example, a drive system 17. The drive system 17 may comprise a motor that may be configured to drive a gear mechanism, a tool holder, a drive shaft, a spindle and/or an output member 19. The gear mechanism may be configured to receive the input of the drive system 17 and translate, reduce, or increase the mechanical motion of the drive system 17 to the output motion of the drive shaft, the spindle, and/or the output member 19. Embodiments of the tool 10 may comprise the drive system 17 being configured to drive components of the tool 10, either directly or through a gear mechanism, to provide or result in the mechanical output that powers or drives the operational aspects of the tool 10.

The housing 11 may comprise a front end 12 and a back end 14. Coupled to the front end 12 of the housing 11 may be a working end of the tool 10 in the form of a output member 19 for retaining an accessory, such as a work element 16 (e.g., drill bit, screw driving bit, hex-shanked driver bit, hole saws, rotary sanders, wire-wheel brushes, and other accessories adapted to operate via motorized input). Embodiments of the tool 10 may comprise the drive system 17 being configured to drive the output member 19 in a rotary, or other repetitive, motion. In addition thereto, embodiments of the tool 10 may alternatively comprise the drive system 17 being configured to drive the output member 19 in a back-and-forth linear motion, such as for a reciprocating saw.

Embodiments of the tool 10 may comprise a power source 18 that provides powered operation to the drive system 17. The power source 18 may be configured to be detachably coupled to the tool 10. For example, the power source 18 may be a portable and/or rechargeable power source, such as, for example, a rechargeable battery that may be configured to physically couple to the tool 10 at a handle or grip portion 15 that extends outwardly from the housing 11. Specifically, the grip portion 15 may have a first end 15a and a second end 15b, the first end 15a being coupled to the housing 11 and the second end 15b being configured to have detachably coupled thereto the power source 18. In this way, the power source 18 may provide electric power to the drive system 17. Alternatively, the power source 18 may be a pneumatic power source, such as, for example, a compressor hose that may be operatively coupled on one end to the second end 15b of the grip portion 15 and on the other end to a high pressure, compressed fluid source (e.g., air compressor) (not shown). In this way, the compressed fluid may pneumatically drive the operations of the tool 10.

Embodiments of the tool 10 may comprise an actuator 13 that may operatively and selectively couple the power source 18 to the drive system 17. The actuator 13 may be configured to activate a switch (not depicted) for selectively actuating the drive system 17 by providing or restricting power thereto, as the case may be. For example, actuating the actuator 13 from a resting state to an engaged state may operatively couple the power source 18 to the drive system 17, resulting in the drive system 17 driving the motor, the gear mechanism, the output member 19, the drive shaft, and/or the spindle. Further in example, releasing the actuator 13 from the engaged state to the resting state may decouple the power source 18 from the drive system 17, thus causing the drive system 17 to cease driving the motor, the gear mechanism, the output member 19, the drive shaft, and/or the spindle. Embodiments of the tool 10 may further comprise a reversing switch (not depicted) that selectively reverses a direction in which the drive system 17 drives the output member 19 (i.e., clockwise versus counter-clockwise).

As depicted, the tool 10 may be a battery-powered, power tool. However, the tool 10 may be any type of corded, cordless, pneumatic, electric, or combustion powered tool, such as a precision assembly tool, a screwdriver, an impact driver or wrench, a hammer, a hammer drill, a nailer, a stapler, a saw, a grinder, a sander, a router, and/or a flashlight. For example, embodiments of the tool 10 may comprise the tool 10 being a battery-powered, precision assembly tool that is utilized in the electronics assembly industry and is designed to achieve the correct torque and angle control of assembly parts and fasteners.

Embodiments of the tool 10 may comprise a force sensor 30. The force sensor 30 may be configured to measure, monitor, ascertain, sense, or otherwise determine a characteristic value of the drive system 17, such as a force exerted upon or required by the drive system 17 to drive the motor, the gear mechanism, the output member 19, the drive shaft, or the spindle, as the case may be. For example, the force sensor 30 may be operatively and functionally coupled to the drive system 17 to thereby measure, monitor, ascertain, sense, or otherwise determine a force value, such as a rotational force or torque exerted upon or required by the drive system 17. Further in example, the force sensor 30 may be operatively and functionally coupled to one or more of the output member 19, the drive shaft, or the spindle to thereby measure, monitor, ascertain, sense, or otherwise determine a force value, such as a rotational force or torque exerted upon or required thereby. The force sensor 30 may be configured to measure, monitor, ascertain, sense, or otherwise determine a torque value required by the drive system 17 to cause the output member 19, having an accessory coupled thereto, to drive a fastener 4 into or onto a workpiece 2. The force sensor 30 may be configured to measure, monitor, ascertain, sense, or otherwise determine a torque value exerted upon the drive system 17 by the interaction between the fastener 4 and the workpiece 2 as the output member 19, having an accessory coupled thereto, drives the fastener 4 into or onto the workpiece 2. The force sensor 30 may be operatively and functionally coupled to a control unit 60, so that the force sensor 30 may communicate the force values measured by the force sensor 30 (i.e., measured force values) to the control unit 60. These measured force values may be utilized by the control unit 60 to govern operational aspects and capabilities of the tool 10, to be described herein. The force sensor 30 may be a type of torque transducer that senses, measures, and communicate these measured force values to the control unit 60.

Embodiments of the tool 10 may comprise a positional sensor 40. The positional sensor 40 may be configured to measure, monitor, ascertain, sense, or otherwise determine a characteristic value of the drive system 17, such as a positional value and/or a rotational quantity of the drive system 17 while driving the motor, the gear mechanism, the output member 19, the drive shaft, and/or the spindle, as the case may be. For example, the positional sensor 40 may be operatively and functionally coupled to the drive system 17 to thereby measure, monitor, ascertain, sense, or otherwise determine a positional or rotational value, such as a rotational position or number of rotations of the motor. Further in example, the positional sensor 40 may be operatively and functionally coupled to one or more of the output member 19, the drive shaft, or the spindle to thereby measure, monitor, ascertain, sense, or otherwise determine a positional or rotational value, such as a rotational position or number of rotations of the respective component part to which the positional sensor 40 is operatively or functionally coupled. The positional sensor 40 may be configured to measure, monitor, ascertain, sense, or otherwise determine a rotational position or number of rotations of the drive system 17 to cause the output member 19 to drive the fastener 4 into or onto the workpiece 2. The force sensor 30 may be configured to measure, monitor, ascertain, sense, or otherwise determine a rotational position or number of rotations of the drive system 17 after and as a result of driving the fastener 4 into or onto the workpiece 2. The positional sensor 40 may be operatively and functionally coupled to a control unit 60, so that the positional sensor 40 may communicate the positional value and/or number of rotations measured by the positional sensor 40 (i.e., measured position and rotation values) to the control unit 60. These measured position and rotation values may be utilized by the control unit 60 to govern operational aspects and capabilities of the tool 10, to be described herein. The positional sensor 40 may be a type of motor controller, encoder, transducer, stepper motor controller, and/or servo controller or servo mechanism that senses, measures, and communicates these measured positional values to the control unit 60.

Embodiments of the tool 10 may comprise a lighting unit 50. The lighting unit 50 may be positioned proximate the front end 12 of the housing 11. Such a position may be advantageous to the operation of the tool 10 in that with the lighting unit 50 positioned in the front end 12 of the housing 11, the lighting unit 50 may be able to shine, display, exhibit, or otherwise emanate light onto a workpiece 4 or even a fastener 4 that is being coupled to the workpiece 2. In addition thereto, the lighting unit 50 may be positioned on a top portion of the housing 11, the top portion being oriented on an opposite side of the housing 11 from the actuator 13 and the grip portion 15. Thus, embodiments of the tool 10 may comprise the lighting unit 50 being not only positioned near the front end 12 but also on a top portion of the housing 11 so as to be in plain sight to a user of the tool 10. Such a position may be advantageous to the operation of the tool 10 in that with the lighting unit 50 positioned not only in the front end 12 of the housing 11 but also on a top portion thereof, the user of the tool 10 may more easily view the light emanating from the lighting unit 50 during and after operation of the tool 10.

The lighting unit 50 may comprise one or more lighting elements 52. The lighting elements 52 may be comprised of LEDs, fluorescent bulbs, incandescent bulbs, or any combination of the preceding. The lighting unit 50 may be configured to display one or more colors of light. For example, the lighting unit 50 may be configured to display or exhibit a first color of light during operation of the tool 10 or when the actuator 13 is transitioned to the engaged state. The lighting unit 50 may be configured and oriented with respect to the tool 10 to direct the light emanating from the lighting unit 50 onto the workpiece 2 and/or the fastener 4 during operation of the tool 10 to drive or otherwise couple the fastener 4 to the workpiece 2. In addition thereto, the lighting unit 50 may be configured to display and/or exhibit more than the first color of light, based on instruction received from the control unit 60. For example, the lighting unit 50 may be configured to display and/or exhibit a second color of light, a third color of light, a fourth color of light, etc. Each of the various colors of light may be a different color than the other. For example, the first color of light may be a white or bright color, whereas the second, third, fourth, and so on colors may be red, green, yellow, orange, blue, purple, etc. Or, in the alternative, one or more of the colors of light may be a shade of the same color. For example, the first color may be one color and the second and third colors, etc. may be a shade of the same color. Or, the first color may be one color and the second and third colors, etc. may be a shade of a different color than the first color. The lighting unit 50 may comprise a single lighting element 52 from which the various light colors may emanate. For example, single lighting element 52 of the lighting unit 50 may be configured to exhibit the first light color depending on the operational state of the tool 10, followed by the second and/or third colors, etc. depending upon the operational state of the tool 10 and the instructions received from the control unit 60. Alternatively, the lighting unit 50 may comprise a plurality of lighting elements 52 from which one or more of the various light colors may emanate. For example, one or more lighting elements 52 of the lighting unit 50 may be configured to exhibit the first light color depending on the operational state of the tool 10, followed by the second and/or third colors, etc. emanating from one or more of the other lighting elements 52 depending upon the operational state of the tool 10 and the instructions received from the control unit 60.

Embodiments of the tool 10 may further comprise a control unit 60 in electrical and operational communication with at least some components of the tool 10. The control unit 60 may comprise at least one processor (e.g., a microprocessor or microcontroller), which may be configured to operate according to instructions, algorithms, or program code and data stored in the memory. The memory may comprise non-volatile, read-only memory (ROM) and/or rewriteable memory, such as one or more EEPROMs and flash memory or mechanically addressable memory, such as a hard drive. The memory may also include volatile memory, such as RAM, DRAM and SRAM. The memory 64 may be configured to store one or more instructions, algorithms, program codes and/or data that may govern the operational aspects of the tool 10.

Embodiments of the tool 10 may further comprise the control unit 60 being configured to permit or restrict some of the general operational aspects of the tool 10. For example, the control unit 60 may be configured to sense the state of the actuator 13, such that under the condition the actuator 13 is transitioned from the resting state to the engaged state the control unit 60 permits the drive system 17 to operate by drawing power from the power source 18, and such that under the condition the actuator 13 is released from the engaged state to the resting state the control unit 60 instructs the drive system 17 to halt by disengaging the drive system 17 from the power source 18. For example, when an operator depresses the actuator 13, the control unit 60 may instruct the power source 18 to provide power to the drive system 17 and when the operator releases the actuator 13, the control unit 60 may instruct the power source 18 to cut power to the drive system 17.

Embodiments of the tool 10 may further comprise the control unit 60 being configured in electrical, functional, and operational communication with the force sensor 30, the positional sensor 40, the drive unit 17, and the lighting element 50, among other components, so as to govern the operational aspects of the tool 10. The control unit 60 may be configured to receive and process the characteristic values of the drive system 17 sensed and measured by each of the force sensor 30 and the positional sensor 40. These characteristic values may be measured and communicated during operation of the tool 10, such as for example, while the actuator 13 is in the engaged position and power is delivered by the power source 18 to the drive system 17. In fact, the sensors 30 and 40 may sense and measure the respective characteristic value continuously during operation of the tool 10, or while the actuator 13 is in the engaged position. Alternatively, the sensors 30 and 40 may sense and measure the respective characteristic values at or near the time the actuator 13 transitions from the engaged position to the disengaged position. As such, embodiments of the tool 10 may comprise the force sensor 30 and the positional sensor 40 being configured to communicate their respective sensed and measured characteristic values of the drive system 17 to the control unit 60.

Upon receipt of the characteristic values of the drive system 17, the control unit 60 may be configured to compare these measured characteristic values to one or more predetermined values stored in the memory. The predetermined values may comprise a predetermined torque value of the drive system 17, a predetermined rotational position of the drive system 17, and/or a predetermined number of rotations of the drive system 17. These predetermined values may be determined and programmed into the tool 10 prior to operation of the tool 10, so as to be present and available to the control unit 60 during use of the tool 10. If needed, these predetermined values may be changed or altered by the user, as the case may be and depending upon the required operation of the tool 10. These predetermined values may correspond to the torque required by the drive system 17 to properly fasten or couple a particular fastener 4 to the workpiece 2. For example, for a particular fastener 4, the user may already know that to drive the fastener 4 successfully into the workpiece 2 requires a specific torque value, values, or value over time. As such, the user may pre-program the tool 10 to store these torque values or values over time. Once programmed, the tool 10 is ready for operation. Once the tool 10 is used to tighten the fastener 4 to the workpiece 2, the sensors 30 and 40 may report the characteristic values of the drive system 17 to the control unit 60 and the control unit 60 may compare these characteristic values with the pre-programmed values to thereby determine whether or not the fastening operation has been performed successfully. In addition thereto, these predetermined values may correspond to the number of rotations required by the drive system 17 to properly fasten or couple a particular fastener 4 to the workpiece 2. For example, for a particular fastener 4, the user may already know that to drive the fastener 4 successfully into the workpiece 2 requires a specific number of rotations of the drive system 17. As such, the user may pre-program the tool 10 to store the required number of rotations, even down to portions or fractions of a complete rotation. Once programmed, the tool 10 is ready for operation. Then, when the tool 10 is used to tighten the fastener 4 to the workpiece 2, the sensors 30 and 40 may report the characteristic values of the drive system 17 to the control unit 60 and the control unit 60 may compare these characteristic values with the pre-programmed values to thereby determine whether or not the fastening operation has been performed successfully. In addition, these predetermined values may correspond to the required rotational position of the drive system 17 at the end of the fastening or coupling process of a particular fastener 4 to the workpiece 2. For example, for a particular fastener 4, the user may already know that to drive the fastener 4 successfully into the workpiece 2 requires the drive system to arrive at a particular rotational position from its starting position. As such, the user may pre-program the tool 10 to store the required positional rotation, even fractions of a complete rotation. Once programmed, the tool 10 is ready for operation. Then, when the tool 10 is used to tighten the fastener 4 to the workpiece 2, the sensors 30 and 40 may report the characteristic values of the drive system 17 to the control unit 60 and the control unit 60 may compare these characteristic values with the pre-programmed values to thereby determine whether or not the fastening operation has been performed successfully.

As stated, by comparing the measured characteristic values of the drive system 17 to the predetermined values, the control unit 60 may verify that the fastening process of any given fastener 4 is performed properly, or according to predetermined specifications/requirements. In other words, if the measured characteristic values of the drive system 17 comply with the predetermined values, then the control unit 60 may indicate that the fastening process of the fastener 4 has been performed properly. On the other hand, if the measured characteristic values of the drive system 17 do not comply with the predetermined values, then the control unit 60 may indicate that the fastening process of the fastener 4 has not been performed properly.

In comparing the measured characteristic values of the drive system 17 to the predetermined values, the control unit 60 may calculate a difference between the respective measured characteristic values and the corresponding predetermined values. If the difference is within a predetermined threshold, or in other words the measured characteristic value is close enough to the predetermined value, then the control unit 60 may determine the fastening or tightening operation has been performed properly. However, if the difference is outside a predetermined threshold, or in other words the measured characteristic value is not close enough to the predetermined value, then the control unit 60 may determine the fastening or tightening operation has not been performed properly. The control unit 60 may also be programmed to store one or more ranges for the difference between the measured characteristic values and the corresponding predetermined values. In this way, the control unit 60 may be able to categorize by the appropriate range the amount of discrepancy, or difference, between the measured characteristic value and the corresponding predetermined value.

Embodiments of the tool 10 may further comprise the tool 10 being configured to indicate or display to the user whether or not the fastening or tightening operation of the fastener 4 has been performed properly for each fastener 4. For example, the tool 10 may be configured to shine a first light, such as a white light, onto the fastener 4 to assist the user in locating the fastener 4 and properly engaging the tool 10 with the fastener 4. Then, the fastening operation may be performed and the sensors 30 and 40 may communicate the measured characteristic values to the control unit 60. The control unit 60 may thereafter draw the comparisons between the measured characteristic values and the predetermined values stored in the memory and determine whether the fastening operation has been performed properly. If the control unit 60 determines the fastening operation has been performed properly, the control unit 60 may instruct the lighting unit 50 to illuminate the fastener 4 or the workpiece 2 in a light having a second color other than the first color. As such, the first color may be a type of headlight, whereas the second light may be a type of colored status light to indicate to the user that the fastening operation has been performed properly. The second light may a green color, or another suitable color associated with a successful operation. On the other hand, if the control unit 60 determines the fastening operation has not been performed properly, the control unit 60 may instruct the lighting unit 50 to illuminate the fastener 4 or the workpiece 2 in a light having a third color, different than either the first color or the second color. As such, the third light may also be a type of colored status light to indicate to the user that the fastening operation has not been performed properly. The third light may a red color, or another suitable color associated with an unsuccessful operation.

The lighting unit 50, as herein described, may be configured and oriented such that light emanating from the lighting unit 50 may completely engulf or illuminate the fastener 4, so that the user cannot mistake the indicated status of the fastening operation for the particular fastener 4. The lighting unit 50 may also be configured to focus a light beam on the end of the accessory or work element that engages the fastener 4, to thereby illuminate the fastener 4. Moreover, upon cessation of the fastening operation by the tool 10 for each fastener 4, the control unit 60 may be configured, as described herein, to immediately, promptly, or instantaneously communicate instructions to the lighting unit 50 to display the appropriate status of the fastening operation for the particular fastener 4. Such cessation may be at the time the user releases the actuator 13 to disconnect the power supply 18 from the drive system 17 or may be at the time the fastener 4 binds, stops, or otherwise halts for whatever reason in the workpiece 2; the control unit 60 may sense that the drive system 17 has halted for whatever reason. In this way, the user may be immediately notified of the status of the fastening operation for the particular fastener 4 in the workpiece 2, and may thereby take appropriate action to move on to the next fastener 4 or to fix the operation of the previous fastener 4.

Embodiments of the tool 10 may be configured for the control unit 60 to reset the lighting unit 50 to the light of the first color after a predetermined amount of time has passed from the cessation of the fastening operation, or upon the activation of the actuator 13, or other input. With the reset capability, the user may sequentially move and use the tool 10 from fastener 4 to fastener 4 without interruption of the described operations of the tool 10.

Including the disclosure of the structure and methods of operation of the tool 10 set forth above, embodiments of the tool 10 may comprise a method of fastening a fastener using a power tool 10. The method may include providing a power tool having an internal drive system coupled to an output member. The method may include engaging the workpiece by way of the output member. The method may include applying mechanical force to the workpiece by providing power to the drive system to rotate the output member. The method may include measuring a characteristic variable of the drive system. The method may include comparing the characteristic variable to a predetermined variable. The method may include controlling a light unit based on the comparing.

The method may include exhibiting a first light color from the light unit onto the workpiece during the applying mechanical force to the workpiece.

The method may include wherein the controlling a light unit further comprises exhibiting a second light color from the light unit onto the workpiece if the characteristic variable is within a tolerance range.

The method may include wherein the controlling a light unit further comprises exhibiting a third light color from the light unit onto the workpiece if the characteristic variable is outside the tolerance range.

The method may include wherein the measuring a characteristic variable of the drive system occurs after the applying mechanical force to the workpiece has ceased.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A power tool comprising:
a housing containing an internal drive system that drives an output member;
a work element coupled for rotation with the output member, the work element being configured to engage a workpiece and exert mechanical force thereupon;
a sensor operatively connected to the internal drive system to sense a characteristic variable of the internal drive system;
an illumination light unit positioned on a front end of the housing and configured to direct light to the workpiece and provide illumination to the workpiece; and
a control unit operatively connected to the internal drive system and the illumination light unit, the control unit configured to control the illumination light unit based on the characteristic variable of the internal drive system measured by the sensor, the projection of light from the illumination light a result of the control unit controlling the illumination light on the basis of the characteristic value;
wherein a reflective light emanates from the workpiece when the light is directed to the workpiece as a result of the control unit controlling the illumination light, the reflective light being at a level sufficient to be detected by a user of the power tool such that the user can determine the control unit is controlling the illumination light on the basis of the characteristic value when the illumination light is positioned such that the user cannot directly view the illumination light.

2. The power tool of claim 1, wherein the sensor is a force sensor and the characteristic variable is a torque value of the internal drive system.

3. The power tool of claim 1, wherein the sensor is a positional sensor and the characteristic variable is a rotational value of the drive system.

4. The power tool of claim 1, wherein the illumination light unit is positioned on a top portion of the housing.

5. The power tool of claim 1, wherein the illumination light unit exhibits light of varying color.

6. The power tool of claim 1, further comprising a power source and an actuator that transitions between an engaged state and a disengaged state, wherein in the engaged state the internal drive system is coupled to the power source for powered operation of the tool, and wherein in the disengaged state the internal drive system is decoupled from the power source.

7. The power tool of claim 6, wherein in the engaged state the illumination light unit exhibits light of a first color.

8. The power tool of claim 7, wherein the control unit receives the characteristic variable from the sensor and calculates a difference between the characteristic variable and a predetermined value, and wherein if the difference is within a first range the control unit directs the illumination light unit to exhibit light of a second color, if the difference is within a second range the control unit directs the illumination light unit to exhibit light of a third color, and if the difference is within a third range the control unit directs the illumination light unit to exhibit light of a fourth color.

9. The power tool of claim 7, wherein the control unit receives the characteristic variable from the sensor and calculates a difference between the characteristic variable and a predetermined value, and wherein if the difference is within a predetermined tolerance the control unit directs the illumination light unit to exhibit light of a second color, and wherein if the difference is outside the predetermined tolerance the control unit directs the illumination light unit to exhibit light of a third color.

10. The power tool of claim 8, wherein the predetermined value is one of a required torque value or a number of rotations of the drive system.

11. The power tool of claim 9, wherein the predetermined value is one of a required torque value or a number of rotations of the drive system.

12. A power tool comprising:
a housing containing an internal drive system that drives an output member;
a work element coupled for rotation with the output member, the work element being configured to engage a workpiece and exert mechanical force thereupon;
a first sensor operatively connected to the internal drive system to sense a first characteristic variable of the internal drive system during engagement of the workpiece;
a second sensor operatively connected to the internal drive system to sense a second characteristic variable of the internal drive system during engagement of the workpiece;
an illumination light unit positioned on a front end and a top portion of the housing and configured to direct light of a first color to the workpiece so as to provide illumination to the workpiece; and
a control unit operatively connected to the internal drive system and the illumination light unit, the control unit configured to control the illumination light unit based on the characteristic variable of the internal drive system measured by the sensors, the projection of light from the illumination light a result of the control unit controlling the illumination light on the basis of the characteristic value;
wherein a reflective light emanates from the workpiece when the light of a first color is directed to the workpiece as a result of the control unit controlling the illumination light, the reflective light being at a level sufficient to be detected by a user of the power tool such that the user can determine the control unit is controlling the illumination light on the basis of the characteristic value without need of the user to directly view the illumination light.

13. The power tool of claim 12, wherein the first sensor is a force sensor and the first characteristic variable is a torque value of the drive system, and wherein the second sensor is a positional sensor and the second characteristic variable is a number of rotations of the internal drive system.

14. The power tool of claim 13, wherein the control unit receives the characteristic variables from the sensors and calculates a difference between each of the characteristic variables and a corresponding predetermined value, and wherein if both of the differences are within a predetermined tolerance the control unit directs the illumination light unit to exhibit light of a second color, and wherein if either of the differences is outside the predetermined tolerance the control unit directs the illumination light unit to exhibit light of a third color.

15. The power tool of claim 14, further comprising a power source and an actuator that transitions between an engaged state and a disengaged state, wherein in the engaged state the internal drive system is coupled to the power source for powered operation of the tool, and wherein in the disengaged state the internal drive system is decoupled from the power source, and wherein the control unit calculates the difference and directs the illumination light unit at a transition from the engaged state to the disengaged state.

* * * * *